US012107467B2

(12) United States Patent
Hauer et al.

(10) Patent No.: US 12,107,467 B2
(45) Date of Patent: Oct. 1, 2024

(54) TRANSPORT DEVICE

(71) Applicant: B&R Industrial Automation GmbH, Eggelsberg (AT)

(72) Inventors: Michael Hauer, Eggelsberg (AT); Stefan Flixeder, Eggelsberg (AT); Karlo Radman, Eggelsberg (AT)

(73) Assignee: B&R Industrial Automation GmbH, Eggelsberg (AT)

( * ) Notice: Subject to any disclaimer, the term of this patent is extended or adjusted under 35 U.S.C. 154(b) by 230 days.

(21) Appl. No.: 17/780,418

(22) PCT Filed: Nov. 25, 2020

(86) PCT No.: PCT/EP2020/083275
§ 371 (c)(1),
(2) Date: May 26, 2022

(87) PCT Pub. No.: WO2021/105155
PCT Pub. Date: Jun. 3, 2021

(65) Prior Publication Data
US 2022/0416633 A1    Dec. 29, 2022

(30) Foreign Application Priority Data
Nov. 27, 2019   (AT) .............................. A 51035/2019

(51) Int. Cl.
*H02K 16/02*    (2006.01)
*B65G 54/02*    (2006.01)
(Continued)

(52) U.S. Cl.
CPC ........... *H02K 16/025* (2013.01); *B65G 54/02* (2013.01); *H02K 41/02* (2013.01); *H02K 41/031* (2013.01); *H02K 2213/03* (2013.01)

(58) Field of Classification Search
CPC ........ B65G 23/23; B65G 54/02; H02K 41/02; H02K 2201/18; H02K 16/025; H02K 41/031; H02K 2213/03
(Continued)

(56) References Cited

U.S. PATENT DOCUMENTS 9,202,719 B2   12/2015   Lu et al.
9,828,192 B2   11/2017   Baechle et al.
(Continued)

FOREIGN PATENT DOCUMENTS

CN         101609265 A    12/2009
DE      102016224951 A1     6/2018
(Continued)

OTHER PUBLICATIONS

Zheng Tong et al., "A New Multi-Objective Optimization Method of Magnetic Levitation Planar Motor", IEEE Transactions on Magnetics (vol. 55, Issue: 8, Aug. 2019), May 1, 2019, DOI: 10.1109/TMAG.2019.2911606.
(Continued)

*Primary Examiner* — James R Bidwell
(74) *Attorney, Agent, or Firm* — Dykema Gossett PLLC (57) ABSTRACT

Various aspects of the present disclosure are directed to a transport device in the form of a planar motor. In one example embodiment, the transport device includes at least one transport segment that forms a transport plane, at least one first transport unit that moves at least two-dimensionally on the transport plane, and a plurality of drive coils arranged on the at least one transport segment. The transport device further includes at least one first and at least one second magnet group arranged on the at least one first transport unit. Each magnet group has a plurality of drive magnets with a different direction of magnetization arranged one behind the other in a specific arrangement direction with a specific pole (Continued)

pitch. The transport device further includes a first coil group having a first plurality of drive coils, and a second coil group having a second plurality of drive coils.

23 Claims, 6 Drawing Sheets (51) Int. Cl.
*H02K 41/02* (2006.01)
*H02K 41/03* (2006.01)

(58) Field of Classification Search
USPC .......................................... 198/805
See application file for complete search history.

(56) References Cited

U.S. PATENT DOCUMENTS

| | | | |
|---|---|---|---|
| 9,878,813 B2 | 1/2018 | Eberhardt et al. | |
| 11,437,902 B2* | 9/2022 | Brinkmann | B65G 54/02 |
| 2004/0007920 A1 | 1/2004 | Teng | |
| 2016/0161288 A1* | 6/2016 | Lu | H01L 21/67259 |
| | | | 324/207.2 |
| 2017/0179805 A1 | 6/2017 | Lu | |
| 2020/0169157 A1* | 5/2020 | Weber | B65G 23/23 |
| 2021/0099119 A1* | 4/2021 | Sun | B65G 35/06 |

FOREIGN PATENT DOCUMENTS

| | | | | |
|---|---|---|---|---|
| KR | 20170100009 A * | 9/2017 | ........... | H02K 41/031 |
| WO | 2013112759 A1 | 8/2013 | | |
| WO | 2017005457 A1 | 1/2017 | | |
| WO | WO-2019045017 A1 * | 3/2019 | ............. | H02K 1/278 |

OTHER PUBLICATIONS

M.M., Rovers, et al., 2013. Design and measurements of the Double Layer Planar Motor. In: International Electric Machines & Drives Conference. Chicago, May 12, 2013-May 15, 2013. IEEE.

* cited by examiner

TRANSPORT DEVICE

CROSS-REFERENCE TO RELATED APPLICATIONS

This application is a national stage filing based upon International PCT Application No. PCT/EP2020/083275, filed 25 Nov. 2020, which claims the benefit of priority to Austria application No. A 51035/2019, filed 27 Nov. 2019.

BACKGROUND

The invention relates to a transport device in the form of a planar motor having at least one transport segment that forms a transport plane and having at least one transport unit that can be moved at least two-dimensionally on the transport plane, wherein a plurality of drive coils are arranged on the transport segment and at least one first and at least one second magnet group, each having a plurality of drive magnets arranged one behind the other in a specific arrangement direction with a specific pole pitch and having a different direction of magnetization, are arranged on the transport unit, wherein different pole pitches are provided on the at least one transport unit for the at least one first magnet group and the at least one second magnet group, and wherein a first coil group having a plurality of drive coils, which first coil group defines a first main movement direction for moving the transport unit, and a second coil group having a plurality of drive coils, which second coil group defines a second main movement direction for moving the transport unit, are arranged on the transport segment. The invention also relates to a transport unit for a transport device in the form of such a planar motor and a method for operating a transport device in the form of a planar motor.

Planar motors are well known in the prior art. For example, U.S. Pat. No. 9,202,719 B2 discloses the basic design and mode of operation of such a planar motor. A planar motor substantially has a stator that forms a transport plane along which one or more transport units can be moved at least two-dimensionally. The stator is usually made up of one or more transport segments.

In order to move the transport units along the transport plane, a driving force acting on the transport unit is generated in that a magnetic field of the stator (of the transport segment(s)) and a magnetic field of the transport unit interact with each other. In order to cause the transport unit to move in a specific movement direction, at least one of the magnetic fields, i.e., that of the stator and/or that of the transport unit, must change over time in order to follow the movement of the transport unit. In most cases, however, only one magnetic field, usually the one on the stator, changes over time and the other magnetic field (the one on the transport unit) is usually constant, i.e., does not change over time.

Magnetic fields that change over time can be generated, for example, by coils (electromagnets) that can be arranged both on the transport unit and on the stator, in particular on the transport segment. The coils are also often referred to as drive coils. Magnetic fields that do not change over time, i.e., are constant, are typically generated with the help of permanent magnets. These components are often referred to as drive magnets. Depending on the embodiment of the planar motor, these can also be arranged both on the transport unit and on the transport segment. Due to the simpler control, the drive coils are often arranged on the transport segment of the planar motor and the drive magnets on the transport unit.

The drive coils are usually controlled by a control unit in order to generate a moving magnetic field in the desired movement direction. The drive magnets, which interact with the moving magnetic field, are distributed at least two-dimensionally on the transport unit, such that a drive and levitation force can be generated on the transport unit. The transport unit can be moved in the desired movement direction by the driving force, an air gap between the transport unit and the transport segments can be produced and maintained by the levitation force, and tilting forces or moments can be generated. In order to allow the two-dimensional movement of the transport unit, which is characteristic of the planar motor, two-dimensional interaction of the magnetic fields of the transport segments and the transport units is required, wherein one of the two magnetic fields must be variable in time in at least two dimensions or both magnetic fields must be variable in time in at least one dimension (complementary to the other dimension). The drive coils and the drive magnets are advantageously arranged in such a way that, in addition to a one-dimensional movement along the axes spanned by the transport plane, more complex two-dimensional movements of the transport unit in the transport plane are also possible.

A planar motor can be used, for example, as a transport device in a production process, very flexible transport processes with complex movement profiles being implementable. In EP 3 172 156 B1 and EP 3 172 134 B1, for example, such applications of a planar motor as a transport device are shown.

The stators of such planar motors can have different arrangements of drive coils, and the arrangement of the drive magnets on the transport units can also be very different. For example, U.S. Pat. No. 9,202,719 B2 discloses a planar motor having a multi-layer structure of the stator having a plurality of coil planes lying one above the other. The drive coils in adjacent coil planes are orthogonal to one another in order to form two orthogonal main movement directions in which the transport units can be moved. On average, the coil planes are therefore at different distances from the drive magnets of the transport unit. The result of this is that the maximum driving force that can be produced on the transport unit differs in the two main movement directions. In order to compensate for this situation, it is proposed to apply a higher coil current to the drive coils of a coil plane that is further away from the drive magnets of the transport unit than to the drive coils of a coil plane that is closer.

The publication J. M. M., Rovers, et. al, 2013. Design and measurements of the Double Layer Planar Motor. In: International Electric Machines & Drives Conference. Chicago, May 12, 2013-May 15, 2013. IEEE. discloses a planar motor having a layered arrangement of two coil planes. In order to compensate for the different driving force potential in the two main movement directions, which results from the different distances between the drive coils and the magnets of the transport unit, it is proposed that drive coils of different heights be used for the two coil planes. This means that the drive coils further down are more powerful and can produce a larger magnetic field.

WO 2013/112759 A1 discloses a transport device in the form of a planar motor having a stator on which two differently oriented groups of drive coils are arranged alternately in one plane. Two differently oriented magnet groups, each having a plurality of drive magnets, are arranged on the transport unit, wherein the differently oriented magnet groups can have a different pole pitch.

WO 2017/005457 A1 and CN 101609265 A disclose further transport devices in the form of planar motors. In this case, however, the drive coils are arranged on the transport unit and the drive magnets on the stator, which is disadvantageous because the energy supply to the transport unit becomes more complex as a result.

It is an object of the invention to allow more efficient operation of a transport device in the form of a planar motor.

SUMMARY OF THE INVENTION

According to the invention, the object is achieved in that the drive coils of a first coil group are arranged at an average first coil distance from the first magnet group of the transport unit in a normal direction onto the transport plane, and the drive coils of the second coil group are arranged at an average second coil distance from the second magnet group of the transport unit in a normal direction onto the transport plane, said second average coil distance being greater than the first average coil distance, wherein the pole pitch of the at least one first magnet group is smaller than the pole pitch of the at least one second magnet group on the transport unit. The fact that a larger pole pitch is provided for the magnet group that interacts with the drive coils having the larger coil distance means that the transport device can operate more efficiently because the pole pitch substantially influences the penetration depth of the magnetic field generated by the magnet group.

Preferably, at least two transport units are provided in the transport unit, on each of which at least one first and at least one second magnet group, each having a plurality of drive magnets arranged one behind the other in a specific arrangement direction with a specific pole pitch and having a different direction of magnetization, are arranged, wherein all magnet groups of a transport unit have the same pole pitch and wherein the pole pitches of the at least two transport units differ. As a result, depending on the specified boundary conditions of the transport segment, a plurality of different transport units having different pole pitches can be used for different tasks or movement processes.

It can be advantageous if the drive coils of the first coil group are arranged at an average first coil distance from the first magnet groups of the transport units in a normal direction on the transport plane, and the drive coils of the second coil group are arranged at an average second coil distance from the second magnet groups of the transport units in a normal direction onto the transport plane, said second average coil distance being greater than the first average coil distance, wherein a first movement path is defined on the transport plane for the transport unit having the smaller pole pitch, along which first movement path the transport unit can be moved, and a second movement path is defined on the transport plane for the at least one other transport unit having the larger pole pitch, along which second movement path the transport unit can be moved, wherein a portion of the first main movement direction in a movement path length of the first movement path is greater than a portion of the second main movement direction and a portion of the first main movement direction in a movement path length of the second movement path is smaller than a portion of the second main movement direction. This ensures that the transport unit having the smaller pole pitch is mainly moved with the drive coils having the smaller coil distance and the transport unit having the larger pole pitch is predominantly moved with the drive coils having the larger coil distance.

It is particularly advantageous if the pole pitch of the drive magnets of at least one magnet group of at least one transport unit is defined as a function of the average coil distance of the drive coils interacting therewith. As a result, the pole pitch can be adapted to the actual coil distance, which is advantageous because the coil distance is usually predetermined.

Furthermore, it can be advantageous if a magnet height and/or a magnet width of the drive magnets of at least one magnet group of at least one transport unit in a normal direction onto the transport plane is defined as a function of the pole pitch of the respective magnet group. In this way, a reduction in the surface flux density caused by the increase in the pole pitch can be compensated.

It is advantageous if the magnet groups of at least one transport unit have an equal magnet group area and/or have an equal magnet number of drive magnets and/or if the at least one transport unit has a square or rectangular transport unit base. In addition, the drive magnets of at least one magnet group of at least one transport unit preferably each have an equal magnet width, wherein adjacent drive magnets of the magnet group are directly adjacent to each other.

The object is also achieved by a transport unit on which the pole pitches of the at least two magnet groups differ in that a magnet width and/or a magnet height of the drive magnets of at least one magnet group located in the normal direction on the underside of the transport unit is defined as a function of the pole pitch of the respective magnet group.

In addition, the object is with a method according to claim 11.

BRIEF DESCRIPTION OF THE DRAWINGS

In the following, the present invention is described in greater detail with reference to FIG. 1a to 4 which, by way of example, show schematic and non-limiting advantageous embodiments of the invention. In the drawings.

DETAILED DESCRIPTION

Figure 1A:
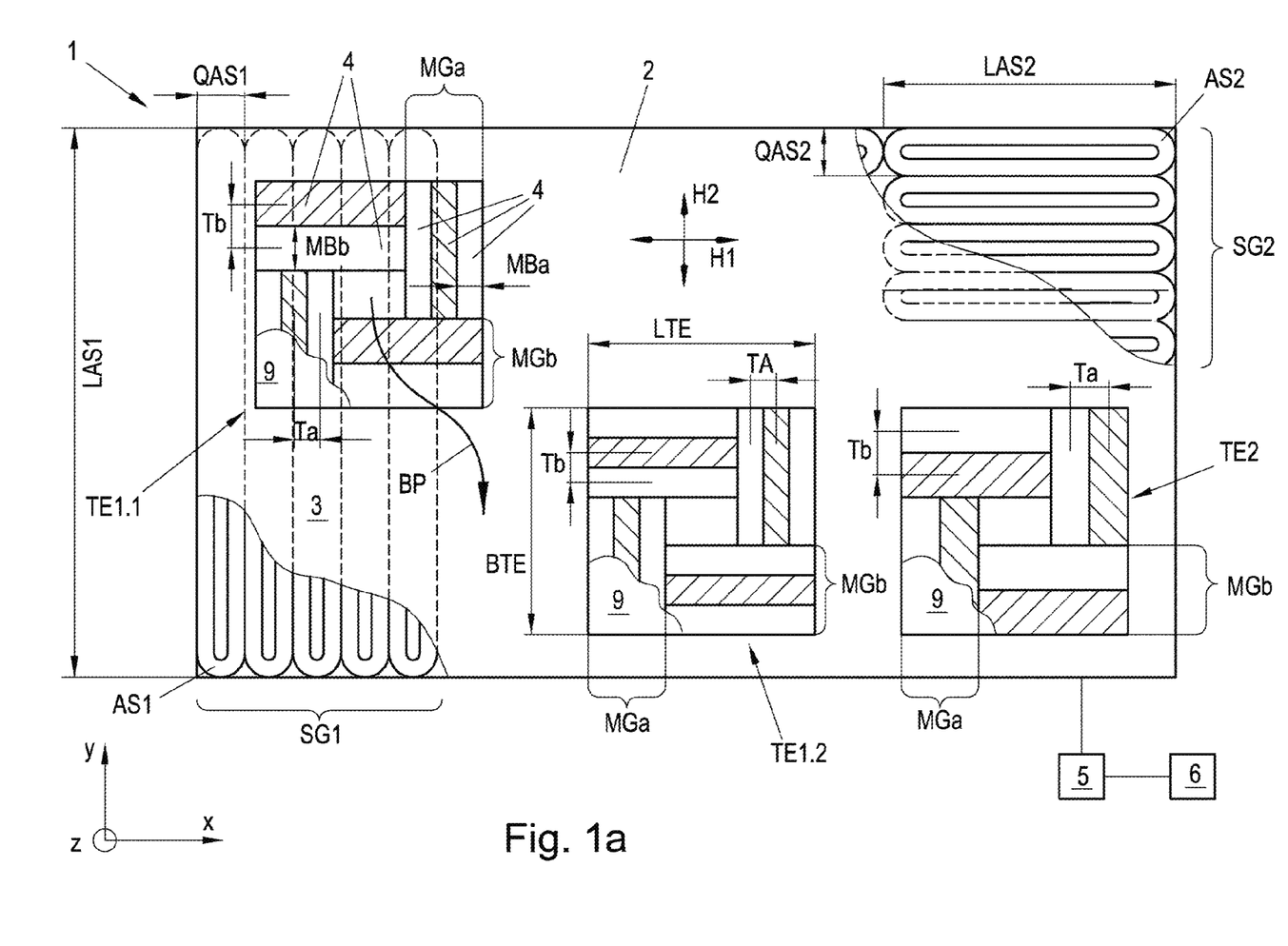
FIG. 1a shows an exemplary transport device in a plan view.
Figure 1B:
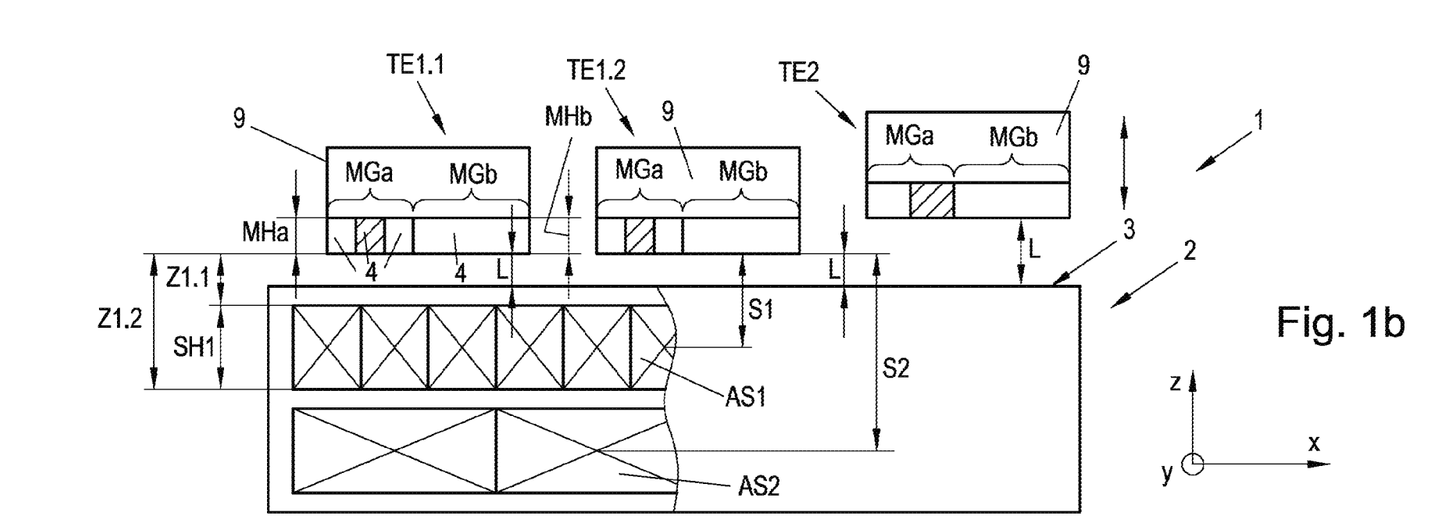
FIG. 1b shows the transport device in a side view.
Figure 1C:
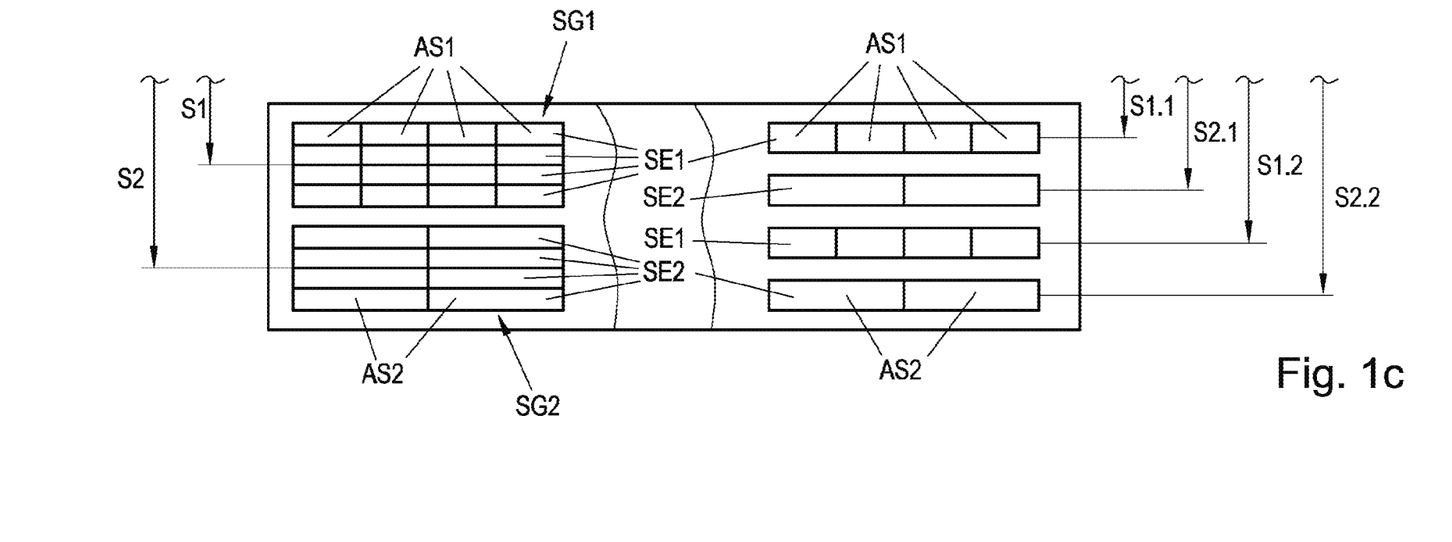
FIG. 1c shows an alternative embodiment of the transport device in a side view.
Figure 4:
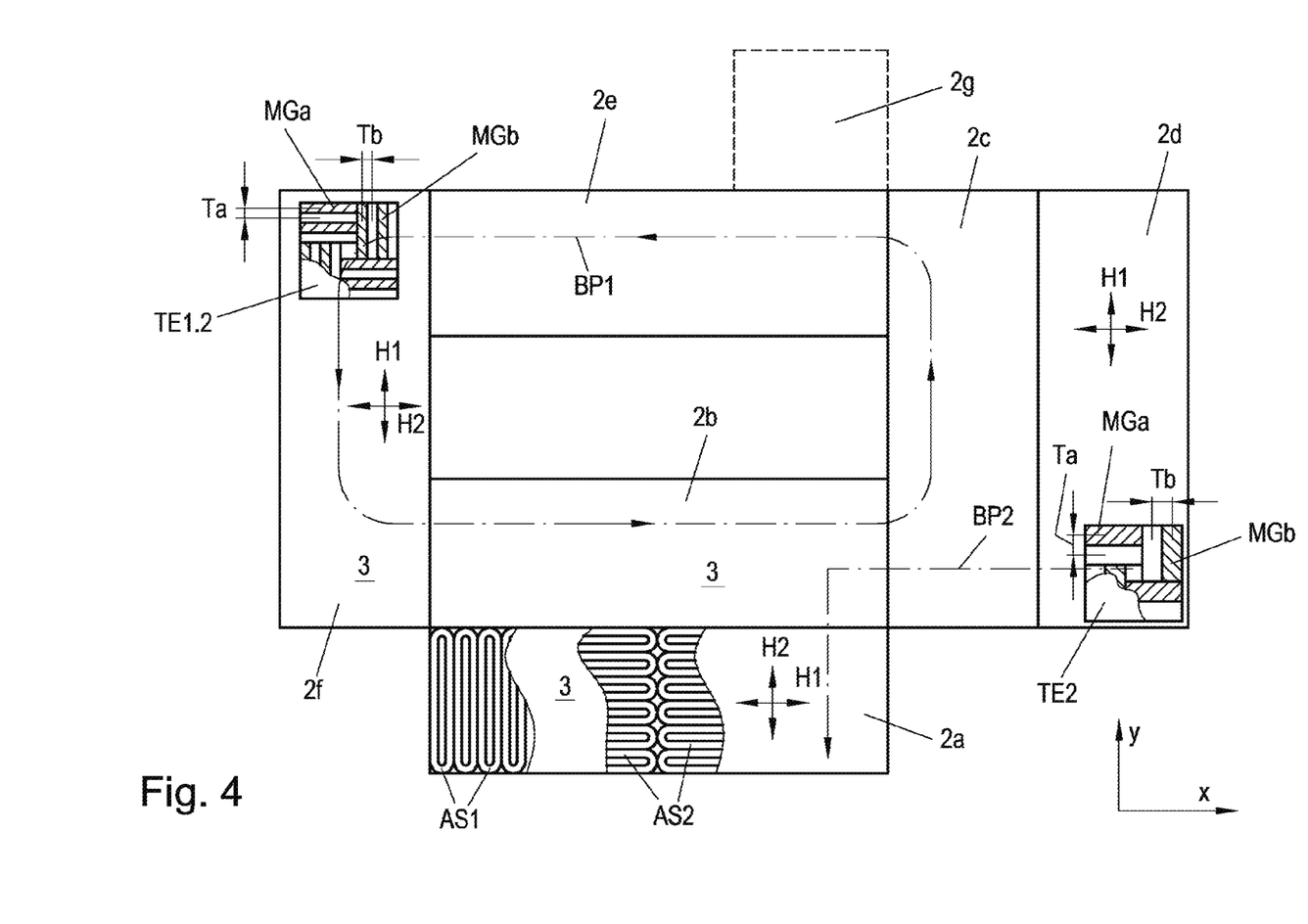
FIG. 4 shows a transport device in a further embodiment in a plan view.

FIGS. 1a-1c show an exemplary embodiment of a transport device 1 in the form of a planar motor in simplified form. FIG. 1a shows the transport device 1 in a plan view and FIG. 1b+1c show the transport device 1 in a side view. The transport device 1 has at least one transport segment 2 as a stator, which transport segment forms a transport plane 3 and at least one transport unit TE, which can be moved at least two-dimensionally along the transport plane 3, preferably in two main movement directions H1, H2. The reference sign "TE" generally stands for any transport unit TE. Below, a first embodiment of the invention is explained with reference to the transport unit TE1.1 and an alternative embodiment is explained with reference to the transport unit TE1.2 and the transport unit TE2. Within the scope of the invention, the transport plane 3 is to be understood as the planar surface of the transport segment 2, which planar surface is determined by the size and shape of the transport segment 2. For the sake of simplicity, only one transport segment 2 is shown in FIG. 1a, but of course a large number of transport segments 2 (also different ones) could also be lined up in order to form a larger transport plane 3, for example as shown in FIG. 4. As a result, the transport device 1 can be constructed in a modular manner and transport planes 3 having shapes and areas of different sizes can be implemented. Of course, this modular design is only optional and only a single transport segment 2 could be provided in the form of a single assembly. In the transport plane 3 of the transport segment 2, it is of course also possible for a plurality of transport units TEi, including different transport units, to be moved simultaneously and independently of one another.

In the example shown, a first coil group SG1 having a plurality of drive coils AS1, which first coil group defines the first main movement direction H1, and a second coil group SG2 having a plurality of drive coils AS2, which second coil group defines the second main movement direction H2, are arranged on the transport segment 2. The drive coils AS1 of the first coil group SG1 are arranged one behind the other in a specific direction, here in the X direction, in order to form the first main movement direction H1 for the movement of the transport unit TE, which in this case extends along the X axis. The drive coils AS2 of the second coil group SG2 are arranged one behind the other in a specific direction, here the Y direction, in order to form a second main movement direction H2 for the transport unit TE, which in this case extends along the Y axis. The drive coils AS1, AS2 of the first and second coil groups SG1, SG2, as shown in FIG. 1*a*, are preferably arranged relative to one another in such a way that the two main movement directions H1, H2 are perpendicular to one another.

The drive coils AS1 of the first coil group SG1 and the drive coils AS2 of the second coil group SG2 are in this case each designed as elongated, conventionally wound coils. The drive coils AS1 of the first coil group SG1 each have a longitudinal extent LAS1 in the Y direction and comparatively smaller transverse extent QAS1 in the X direction and are arranged one behind the other in the direction of their transverse extent QAS1, in this case in the X direction. The direction in which the drive coils AS1 of the first coil group SG1 are arranged one behind the other thus defines the first main movement direction H1 for the movement of the transport unit TE. The drive coils AS1 of the first coil group SG1 are designed as "long coils." This means that the longitudinal extent LAS1 thereof is greater than the extent of the transport unit TE in the respective direction (in this case Y direction), in this case, for example, longer than a transport unit width BTE of the transport unit TE1.2. In the example shown, the longitudinal extent LAS1 is substantially the same size as the extent of the transport segment 2 in the Y direction. A movement of a transport unit TE in the X direction, i.e., in the first main movement direction H1, is thus possible at substantially any point in the Y direction.

The drive coils AS2 of the second coil group SG2 also have a longitudinal extent LAS2 that is shorter here than the longitudinal extent LAS1 of the drive coils AS1 of the first coil group SG1. The longitudinal extent LAS2 of the drive coils AS2 of the second coil group SG2 runs in the X direction here. The drive coils AS2 of the second coil group SG2 also each have a smaller transverse extent QAS2 relative to their longitudinal extent LAS2, in this case in the Y direction. The transverse extent QAS2 is in this case substantially the same size as the transverse extent QAS1 of the drive coils AS1 of the first coil group SG1, but could also be larger or smaller. For the most efficient possible generation of force, the transverse extent QASi of the drive coils ASi can advantageously be adapted to the pole pitch Ti of the magnet group MGi that interacts therewith in each case. It is preferable that the transverse extent QASi of the drive coils ASi that interact with the magnet group MGi having the larger pole pitch Ti is larger than the transverse extent QASi of the drive coils ASi that interact with the magnet group MGi having the smaller pole pitch Ti. The drive coils AS2 of the second coil group SG2 are also arranged one behind the other in the direction of their transverse extent QAS2, in this case in the Y direction. The direction in which the drive coils AS2 of the second coil group SG2 are arranged one behind the other thus defines the second main movement direction H2 for the movement of the transport unit TE.

The drive coils AS2 of the second coil group SG2 are designed as "short coils." This means that the longitudinal extent LAS2 thereof is equal to or smaller than the extent of the transport unit TE in the respective direction (in this case X direction), in this case, for example, the transport unit length LTE of the transport unit TE1.2. In order to nevertheless allow a movement of a transport unit TE in the second main movement H2 along the entire transport plane 3, the drive coils AS2 of the second coil group SG2 are arranged in a plurality of rows next to one another in the X direction, in this case, for example, in three rows. However, a reverse arrangement would also be possible, i.e., "long" coils for the second main movement direction H2 and "short" coils for the first main movement direction H1. In each case, "long" or "short" coils could be used for both main movement directions H1, H2. For example, it can be advantageous in terms of cost savings if identical drive coils AS1=AS2 are used for both coil groups SG1, SG2.

Of course, the embodiment shown is only to be understood as an example and a person skilled in the art could also provide a different arrangement of the coil groups SG1, SG2 and/or other drive coil designs. For example, "PCB coils" could be used in a known manner. PCB stands for "printed circuit board" and means that the coils are integrated directly into a printed circuit board. The two embodiments are known in the prior art, which is why they are not described in greater detail at this point. A different arrangement of the coil groups SG1, SG2 relative to one another and/or to the transport segment 2 would also be conceivable and/or further coil groups SGi having drive coils ASi could also be provided, which form a further main movement directions Hi. In the most common case, however, two differently oriented coil groups SG1, SG2, each having a plurality of drive coils AS1, AS2, are sufficient, wherein each coil group SG1, SG2 defines a main movement direction H1, H2. However, the at least two main movement directions H1, H2 are preferably perpendicular to one another, as shown.

For a modular structure of a transport plane 3, which consists of a plurality of transport segments 2, it is also advantageous if the transport segments 2 each have a square or rectangular transport plane 3. The transport segments 2 can then be lined up in a simple manner such that the respective first main movement direction H1 of a transport segment 2 runs parallel or normal to the first main movement direction H1 of the respective adjacent transport segment 2, as shown for example in FIG. 4. A transport plane 3 can thus be constructed easily and flexibly from a plurality of transport segments 2. It is also not absolutely necessary for adjacent transport segments 2 to be aligned with one another, but an offset would also be possible.

With the transport device 1 shown, a substantially unrestricted movement of a transport unit TE in the two main movement directions H1, H2 would be possible, for example, in the transport plane 3 of the transport segment 2. The transport unit TE could, for example, only be moved along the X axis or only along the Y axis. The transport unit TE can of course be moved simultaneously in both main movement directions H1, H2, for example with a two-dimensional movement path BP located in the transport plane 3 having an X coordinate and a Y coordinate, as indicated on the transport unit TE1.1 in FIG. 1a. With a corresponding structural design of the transport segment 2 and the respective transport unit TE, the other four degrees of freedom can also be used at least to a limited extent (translational movement in the vertical direction Z+ rotation about the three axes X, Y, Z).

A control unit 5 is also provided in the transport device 1, with which control unit the drive coils AS1, AS2 of the transport segment 2 can be controlled, as indicated in FIG. 1a. The control unit 5 can, for example, also be connected to a superordinate system control unit 6 or be integrated therein. If a plurality of transport segments 2 are provided in the transport device 1, a segment control unit (not shown) can also be provided for each transport segment 2 or a group of transport segments 2, and/or a coil control unit can be provided for each drive coil ASi, which can also be integrated in the control unit 5. The movement path BP of a transport unit TE can be specified via the control unit 5 and/or the system control unit 6, for example as a function of a specific production process of a system in which the transport device 1 can be integrated.

As mentioned, a plurality of transport units TE can of course also be moved simultaneously and independently of one another on the transport device 1. The control unit 5 and/or the system control unit 6 then ensures that the movement sequences of the transport units TE are synchronized with one another or coordinated with one another, for example in order to prevent transport units TE from colliding with one another and/or with transported objects. A control program that implements the desired movement paths of the individual transport units TE runs on the control unit 5. The control unit 5 or the system control unit 6 can, for example, also be connected to a planning module for planning the movement path. The planning module can be a computer, for example, on which the transport device 1 actually constructed, in particular the transport plane 3, is implemented virtually, for example.

At least one first magnet group MGa and at least one second magnet group MGb are arranged on the at least one transport unit TE, in each of which a plurality of drive magnets 4 arranged one behind the other in a specific arrangement direction with a specific pole pitch Ta, Tb and having different directions of magnetization are provided. For this purpose, the transport unit TE has a main body 9, on the underside of which (facing the transport plane 3) the drive magnets 4 are arranged, as can be seen in FIG. 1b. In FIG. 1a, the main body 9 is shown largely broken away to be able to see the arrangement of the drive magnets 4.

In the example shown, two first magnet groups MGa and two second magnet groups MGb are arranged on the transport units TE1.1, TE1.2, TE2. Of course, more than two first and second magnet groups MGa, MGb could also be provided. In this case, the arrangement direction of the first magnet groups MGa corresponds to the X direction, and the arrangement direction of the second magnet groups MGb corresponds to the Y direction.

Figure 3:
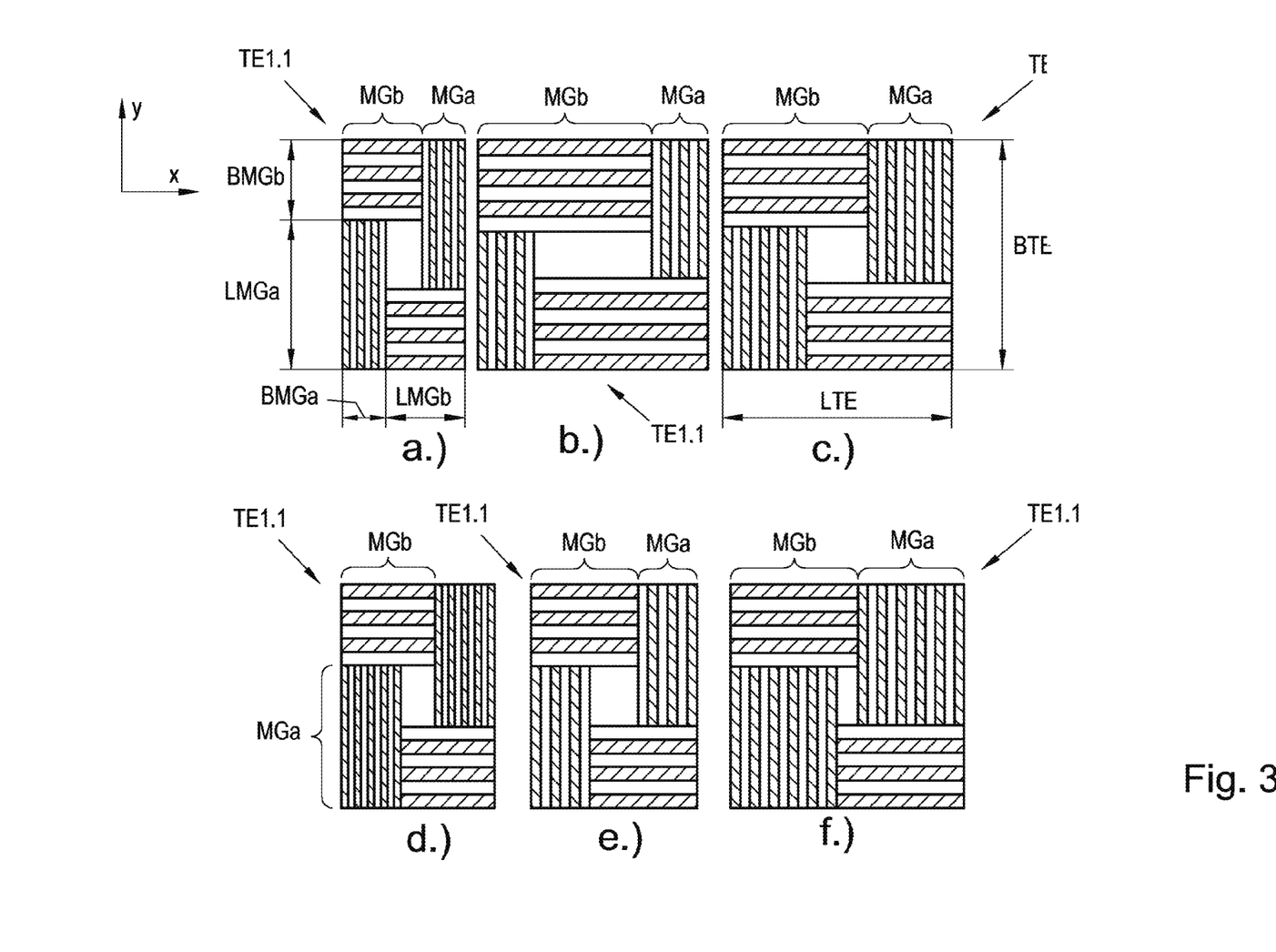
FIG. 3a-3h show different options for arranging drive magnets on a transport unit, each in a view from below.

The arrangement directions are thus perpendicular to one another, analogously to the main movement directions H1, H2. The arrangement directions of the magnet groups MGa, MGb preferably run as parallel as possible to the main movement directions H1, H2 in order to allow the most efficient possible generation of electromagnetic force. The example shown is a known 1D arrangement of the drive magnets 4 on the transport unit TE1.1, but a likewise known 2D arrangement would also be possible, as will be explained in detail with reference to FIG. 3g+3h.

In order to move the transport units TE along the transport plane 3, the first and second drive coils AS1, AS2 can be individually controlled (energized) by the control unit 5. Power electronics that may be required for this can be arranged in the control unit 5 or on the transport segment 2. A substantially moving magnetic field is generated in the first main movement direction H1 by appropriately triggering the first drive coils AS1 in a chronologically offset manner. The moving magnetic field in the first main movement direction H1 mainly interacts electromagnetically with the drive magnets 4 of the first magnet group(s) MGa in order to move the respective transport unit TE in the first main movement direction H1. Analogously, by triggering the second drive coils AS2 in a chronologically offset manner, a substantially moving magnetic field is generated in the second main movement direction H2, which substantially moving magnetic field mainly interacts electromagnetically with the drive magnets 4 of the second magnet group(s) MGb in order to move the transport unit TE in the second main movement direction H2. Depending on the triggering of the drive coils AS1, AS2, the moving magnetic fields are superimposed, as a result of which the transport unit TE can be moved in the desired manner along a predefined two-dimensional movement path BP in the transport plane 3.

In addition to the two substantially unlimited translatory degrees of freedom in the main movement directions H1, H2 in the transport plane 3, a limited translatory movement of a transport unit TE in a normal direction on the transport plane 3 is also possible, in this case in the direction of the Z axis. Depending on the arrangement and design of the drive coils AS1, AS2 of the coil groups SG1, SG2 and the interacting first and second magnet groups MGa, MGb, limited rotation of the transport units TE around the three spatial axes X, Y, Z is also possible.

As mentioned, adjacent drive magnets 4 of the magnet groups MGa, MGb have a different magnetic orientation and are spaced apart from one another in a specific pole pitch Ta, Tb. In general, the magnetic field generated by the magnet group MGi changes its orientation by 180° within the pole pitch Ti. The necessary distance between the drive magnets 4 to generate a magnetic field having the desired pole pitch Ti also depends on the arrangement of the drive magnets 4 within a magnet group MGi, in particular on a gap width of any gap provided between adjacent drive magnets 4, on the direction of magnetization of adjacent drive magnets 4 (e.g. 180° opposite or Halbach arrangement) and on the magnet width MBi of the drive magnets 4. In the known Halbach arrangement, it can be advantageous, for example, if the outermost drive magnets 4 of a magnet group MGi have, for example, half the magnet width MBi of the drive magnets 4 located in between. This can mean that a magnetic north pole and south pole alternate in each case, as indicated in FIG. 1a by the hatched and non-hatched drive magnets 4 on the transport units TE1.1, which corresponds to an arrangement of adjacent drive magnets 4 rotated by 180°. The known Halbach arrangement, in which the direction of magnetization of adjacent drive magnets 4 is rotated by 90° in each case in the direction of the longitudinal axis of the drive magnets 4, has also proven to be advantageous. The pole pitch Ta, Tb is to be understood in each case as the distance between two drive magnets 4 that are adjacent in the arrangement direction and have opposite magnetic orientations (north/south pole). If the drive magnets 4 have an equal magnet width MB (in the arrangement direction), adjacent drive magnets have a direction of orientation rotated by 180° and the drive magnets 4 are directly adjacent to one another (which is usually the case), the pole pitch Ta, Tb corresponds to the respective magnet width MBa, MBb.

During operation, an air gap L is provided between the transport plane 3 of the transport segment 2 and the drive magnets 4 of the magnet groups MGa, MGb of a transport unit TE, as can be seen in FIG. 1b. A preferably magnetically conductive cover layer is preferably also provided on the transport segment 2 in order to shield the underlying drive coils AS1, AS2 from external influences and to form a substantially smooth transport plane 3. The cover layer is shown partly broken away in FIG. 1a to be able to see the arrangement of the drive coils AS1, AS2 located underneath. Similarly, a cover layer to cover the drive magnets 4 can of course also be provided on the transport units TE. The air gap L then extends between the cover layer and the drive magnet 4 of the respective transport unit TEi. In order to generate and in particular maintain the air gap L, the drive coils AS1, AS2 and the drive magnets 4 interact in a known manner during operation not only to generate a driving force (which is required for movement in the main movement directions H1, H2), but also to generate a levitation force FS, in this case in the Z direction. The levitation force FS also acts when the transport unit TE is stationary in order to generate and maintain the air gap L. In addition to the illustrated substantially horizontal installation position of the transport segment 2, an inclined installation position in the manner of an inclined plane or a substantially vertical installation position would of course also be conceivable.

The levitation force FS is the force that acts on the transport unit TE and is opposed to the weight force FG and any process force FP (e.g. weight force of a transported object). In addition to the two-dimensional movement along the transport plane 3, a certain movement of the transport unit TE in the vertical direction is also possible, i.e., normal to the transport plane 3. By appropriate control of the drive coils AS1, AS2, the air gap L can be increased and reduced to a limited extent, as a result of which the transport unit TE can be moved in the vertical direction, in this case in the Z direction, as indicated by the larger air gap L and the double arrow on the transport unit TE2 in FIG. 1b. The extent of the available freedom of movement in the vertical direction depends substantially on the structural design of the transport device 1, in particular on the maximum magnetic field that can be generated by the drive coils AS1, AS2 and the drive magnets 4, as well as the mass and load of the transport unit TE. Depending on the size and design of the transport device 1, the available range of movement in the vertical direction can be, for example, in the range from a few mm to a plurality of centimeters.

In the exemplary embodiment shown, the drive coils AS1 of the first coil group SG1 are arranged at an average first coil distance S1 from the first magnet group MGa in a normal direction (in this case in the Z direction) onto the transport plane 3, and the drive coils AS2 of the second coil group SG2 are arranged at an average second coil distance S2 from the second magnet group MGb in a normal direction onto the transport plane 3, said second average coil distance being greater than the first average coil distance S1, as can be seen in FIG. 1b. The drive coils AS1 of the first coil group SG1 are therefore closer to the drive magnet 4 of the first magnet group MGa in the Z direction than the drive coils AS2 of the second coil group SG2 are to the drive magnet 4 of the second magnet group MGb. In the example shown in FIG. 1b, the two coil groups SG1, SG2 are arranged one above the other.

The average coil distances S1, S2 are measured from the coil center of the respective drive coils AS1, AS2 in the Z direction, as indicated in FIG. 1b with reference to the transport unit TE1.2. The drive coils AS1, AS2 are preferably designed to be ironless in order to avoid disruptive magnetic forces of attraction between the respective transport unit TE and the transport segment 2; these are also referred to as "air coils." In the example shown in FIG. 1a+1b, the drive coils AS1, AS2 are designed as conventionally wound, elongated coils having a substantially oval shape, each having a coil axis in the normal direction onto the transport plane 3. However, the drive coils AS1, AS2 could also be designed as "PCB coils." The drive coils AS1, AS2 of the respective coil group SG1, SG2 can, for example, also be arranged in layers one above the other on the transport segment 2 in a plurality of first coil planes SE1 having first drive coils AS1 and a plurality of second coil planes SE2 having second drive coils AS2 in the normal direction onto the transport plane 3, as shown in FIG. 1c. Furthermore, the drive coils ASi can be designed with different winding schemes, for example: with concentrated winding (as shown in the drawings) or with distributed winding. These winding schemes are well known in the prior art.

In the example on the left of FIG. 1c, a coil block having four first coil planes SE1 and a coil block having four second coil planes SE2 are arranged one above the other on the transport segment 2. In the illustration on the right in FIG. 1c, four first and four second coil planes SE1, SE2 are arranged alternately on the transport segment 2 in the Z direction. The average coil distances S1, S2 are in this case the average distances of the coil planes SE1, SE2 from the transport plane 3 in the Z direction, wherein the following applies $$S1 = \frac{\sum_{i=1}^{j} S1.i}{j}; S2 = \frac{\sum_{i=1}^{k} S2.i}{k}$$

with the coil distances $S1.i$, $S2.i$ of the first and second coil planes SE1, SE2 and the number j, k of the first and second coil planes SE1, SE2.

The drive coils AS1 of the first coil group SG1 produce the same (maximum) magnetic field as the drive coils AS2 of the second coil group SG2 given the same structural boundary conditions (identical geometry of the drive coils AS1 (length, width, height), the same number of windings, etc.) and the same energetic boundary conditions (same maximum electric current or voltage, etc.). So far, the magnet groups MGa, MGb on transport units TE have been designed substantially identically (same geometry (magnet length, magnet width, magnet height), same number, same pole pitch, same directions of magnetization, same magnetic field strength, etc. of the drive magnets 4), such that the magnet groups MGa, MGb produce magnetic fields of substantially equal size, which interact with the magnetic fields generated by the drive coils AS1, AS2. Because the drive coils AS1 of the first coil group SG1 are on average closer to the drive magnet 4 of the first magnet group MGa than the drive coils AS2 of the second coil group SG2 are to the drive magnet 4 of the second magnet group MGb, this leads to higher efficiency of the electromagnetic force production in the first main movement direction H1 than in the second main movement direction H2. This affects both the production of the driving force and the production of the levitation force. As a result, greater efficiency results in the first main movement direction H1 than in the second main movement direction H2.

As mentioned at the outset, attempts have been made in the prior art to compensate for the difference in efficiency between the two main movement directions H1, H2 in order to achieve main movement directions that are as equivalent as possible in terms of the available electromagnetic force. This was achieved, for example, by applying a higher electric current to the drive coils (in this case AS2) that are further away from the transport plane 3 than to the drive coils that are closer (in this case AS1) or by designing the drive coils that are further away from the drive magnet 4 (in this case AS2) to be more powerful than the drive coils that are closer (in this case AS1). However, this is disadvantageous because this means that either the design effort or the control effort is relatively high.

In order to avoid this and still allow the most efficient possible operation of the transport device 1, the invention provides that different pole pitches Ta ≠ Tb are provided for the at least one first magnet group MGa and the at least one second magnet group MGb on the at least one transport unit TE (in this case TE1.1). In the described embodiment of the transport device 1, in which the drive coils AS1 of the first coil group SG1 of the transport segment 2 have a smaller average coil distance S1 than the drive coils AS2 of the second coil group SG2, the pole pitch Ta of the at least one first magnet group MGa of the transport unit TE1.1 is preferably smaller than the pole pitch Tb of the at least one second magnet group MGb of the transport unit TE1.1. Alternatively, it is provided according to the invention that at least two transport units TE (in this case TE1.2, TE2) are arranged in the transport device 1, wherein each of the at least two transport units TE1.2, TE2 has magnet groups MGa, MGb having the same pole pitch Ta=Tb, wherein the pole pitches Ta, Tb of the at least two transport units TE1.2, TE2 differ.

In the transport device 1 of the present invention, the magnetic fields produced by the drive coils AS1, AS2 are not changed on the transport segment side as before, but the magnetic field produced by the respective magnet group MGa, MGb of the transport unit TE1.1 is influenced by changing the pole pitch, in this case pole pitch Tb>Ta, as will be explained in more detail below. In general, increasing the pole pitch Ti means that the magnetic field generated by the respective drive magnet(s) 4 can penetrate further into the transport segment 2 in a normal direction onto the transport plane 3.

The magnetic flux density B of a drive magnet 4 decreases exponentially with the distance z (see FIG. 1b) from the surface of the drive magnet 4, wherein the pole pitch Ti corresponding to $$B(z, Ti) = B_0 * e^{-\frac{\pi}{Ti}*z}$$

is indirectly proportional to the distance z, with the magnetic surface flux density $B_0$ on the surface of the drive magnet 4. The magnet width MBi is proportional to the pole pitch Ti, wherein the proportionality factor depends, among other things, on the direction of magnetization of adjacent drive magnets 4 and the distance between adjacent drive magnets 4. If adjacent drive magnets 4 of a magnet group 4i are directly adjacent to each other (without a gap), have a 180° opposite direction of magnetization and an equal magnet width MBi, the pole pitch Ti can be equated with the magnet width MBi (FIG. 1a). A change in the pole pitch Ti therefore also causes an analogous change in the magnet width MBi and vice versa. It follows from this that a reduction in the efficiency caused by an increase in the average coil distance Si of the drive coils ASi can be at least in part compensated for by an increase in the pole pitch Ti of the corresponding magnet group 4i.

As can be seen from FIG. 1a, the pole pitch Ta of the two first magnet groups MGa (which interact with the drive coils AS1 having a lower average coil distance S1<S2) is therefore lower on the transport unit TE1.1 than the pole pitch Tb of the two second magnet groups MGb (which interact with the drive coils AS2 having the greater average coil distance S2>S1).

The magnetic surface flux density $B_0$ on the surface (facing the transport plane 3) of a drive magnet 4 is a function of the pole pitch Ti and a magnet height MHi (in this case in the Z direction—FIG. 1b). The magnetic surface flux density $B_0$ results in $$B_0(MHi, Ti) = \overline{B}\left(1 - e^{-\frac{\pi}{Ti}*MHi}\right),$$

where $\overline{B}$ is the magnetic flux density of the drive magnet 4, which is known to be proportional to the remanent flux density as a material parameter of the drive magnet 4 and can be regarded as known. It can be seen from this that the surface flux density $B_0$ decreases as the pole pitch Ti increases, but the decrease can be compensated for by increasing the magnet height MHi. As a rule, however, the magnet height MHi of the drive magnets 4 has an upper limit for design and weight reasons and is usually constant for both magnet groups MGa, MGb of a transport unit TE. It is therefore assumed below that only the pole pitch Ti (which in this case corresponds to the magnet width MBi) is variable and that the magnet height MHi of the drive magnets 4 is predetermined.

The surface flux density $B_0$ is therefore only a function of the pole pitch Ti (or magnet width MBi). By substituting the equation for the surface flux density $B_0(Ti)$ into the flux density equation above B(z, Ti) and by means of integration over a coil height SHi of a drive coil ASi in the Z direction SHi ∈ (zi.1, zi.2) one obtains the effective maximum flux density of the magnet group MGi over the coil height SHi of the drive coils ASi as a function of the pole pitch Ti according to $$\int_{zi.1}^{zi.2} B(z, Ti)dz = B_0(Ti) * \frac{T}{\pi}\left(e^{-\frac{\pi}{Ti}zi.1} - e^{-\frac{\pi}{Ti}zi.2}\right).$$

Simple optimization according to the pole pitch Ti results in the optimal pole pitch Ti (which corresponds to the magnet width MBi under certain boundary conditions) to maximize the flux density B of the drive magnet 4 for a combination with a drive coil ASi having a coil height SHi that is arranged at a distance z1.i from the drive magnet 4 in the Z direction and extends to z2.i, as shown in FIG. 1b with reference to the first drive coil AS1. The relationship described is shown graphically in FIG. 2.

Figure 2:
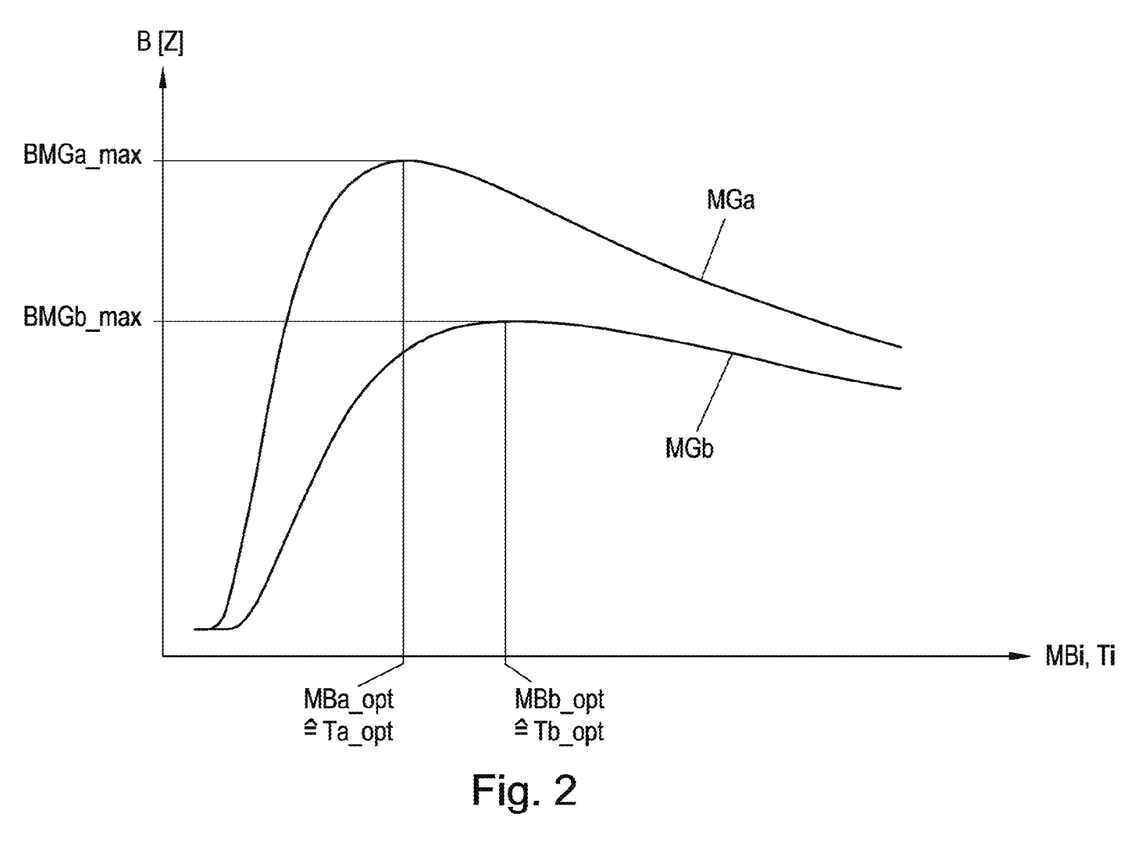
FIG. 2 shows a diagram of the magnetic flux density of a drive magnet over the pole pitch.

FIG. 2 shows a diagram with a qualitative course of the flux density B over the pole pitch Ti, which is proportional to the magnet width MBi. It can be seen from this that the maximum flux density BMGa_max for the drive magnets 4 of the first magnet group MGa of the transport unit T1.1 is achieved with an optimal magnet width MBa_opt or optimal pole pitch Ta_opt, and the maximum flux density BMGb_max for the drive magnets 4 of the second magnet group MGb is achieved with a comparatively larger optimal magnet width MBb_opt or optimal pole pitch Tb_opt. As a result, the pole width Ta of the first magnet group MGa of the transport unit TE1.1 can advantageously be adapted in a targeted manner to the average first coil distance S1 of the drive coils AS1 of the first coil group SG1, and the pole width Tb of the second magnet group MGb of the transport unit TE1.1 can be purposefully adapted to the average second coil distance S2 of the drive coils AS2 of the second coil group SG2.

Various possibilities are shown in FIG. 3a-3f as to how the different pole pitches Ta<Tb can be implemented in a 1D arrangement of drive magnets 4 on a transport unit TE1.1. FIG. 3g+3h shows a possible implementation of different pole pitches Ta<Tb in a 2D arrangement of drive magnets 4 on a transport unit TE1.1. The figures each show the transport unit TE1.1 in a view from below. Two first magnet groups MGa and two second magnet groups MGb are arranged on the transport unit TE1.1 of FIG. 3a-3f. The respective first magnet groups MGa have a magnet group length LMGa and a magnet group width BMGa and the respective second magnet groups MGb have a magnet group length LMGb and a magnet group width BMGb (illustrated only in FIG. 3a). The transport unit TE1.1 itself has a transport unit length LTE and a transport unit width BTE, as indicated in FIG. 3c.

The magnet group width BMGi is the expansion in the direction in which the individual drive magnets 4 of the respective magnet group MGi are arranged one behind the other. The magnet group length LMGi corresponds to the length of the individual drive magnets 4 (=the longitudinal extent) of the respective magnet group MGi. If the magnet groups MGa, MGb extend to the edges of the transport unit TE1.1, which is preferably the case, the transport unit length LTE is composed of the sum of the magnet group width BMGa of the first magnet group MGa and the magnet group length LMGb of the second magnet group MGb. The transport unit TE1.1 is thus moved with its transport unit length LTE in the first main movement direction H1 and with its transport unit width BTE in the second main movement direction H2. The offset of the two first magnet groups MGa in the Y direction and the offset of the two second magnet groups MGb in the X direction can generate a torque about the vertical axis of the transport unit TE1.1, as a result of which the transport unit TE1.1 can rotate about the vertical axis. A single first magnet group MGa and a single second magnet group MGb are substantially sufficient to operate the transport device 1. Of course, more than two first magnet groups MGa and more than two wide magnet groups MGb can also be arranged per transport unit TE. An unequal number of first and second magnet groups MGa, MGb would also be conceivable, for example two first magnet groups MGa and a second magnet group MGb.

The different pole pitch Ta<Tb of the two magnet groups MGa, MGb can now be implemented in different ways. The three properties can substantially be changed: magnet number of the drive magnets 4 of the magnet groups MGi, magnet group area AMGi of the magnet groups MGi and transport unit shape of the transport unit TE1.1. Furthermore, the rotation of adjacent drive magnets 4 relative to one another and the distance between adjacent drive magnets 4 could also be varied, but this will not be discussed in detail here. The transport unit TE1.1 according to FIG. 3a has, for example, the same magnet number NMa=NMb=6 of drive magnets 4 and the same magnet area AMGa=AMGb in both magnet groups MGa, MGb. The magnet group area AMGi of a magnet group MGi results as AMGi=LMGi*BMGi. Because of the different pole pitch Ta<Tb, the second magnet groups MGb have a larger magnet group width BMGb than the first magnet groups MGa. In order to still achieve the same magnet group area AMGa=AMGb, the magnet group length LMGa of the first magnet group MGa is greater than the magnet group length LMGb of the second magnet group MGb. This results in a rectangular transport unit shape of the transport unit TE1.1. having a transport unit length LTE<BTE that is lower relative to the transport unit width BTE, in this case in the X direction.

FIG. 3b-3f show further embodiments. The transport unit TE1.1 in FIG. 3b has a square transport unit shape with LTE=BTE, wherein the first and second magnet groups MGa, MGb have an equal magnet number NMa=NMb=6, but a different magnet group area AMGa=AMGb. The transport unit TE1.1 in FIG. 3c has a square transport unit shape with LTE=BTE, wherein the first and second magnet groups MGa, MGb have an equal magnet group area AMGa=AMGb, but a different magnet number NMa=9, NMb=6. The transport unit TE1.1 in FIG. 3d has a rectangular transport unit shape with LTE<BTE, wherein the first and second magnet groups MGa, MGb have an equal magnet group area AMGa=AMGb, but a different magnet number NMa=9, NMb=6. The transport unit TE1.1 in FIG. 3e has a rectangular transport unit shape with LTE<BTE, wherein the first and second magnet groups MGa, MGb have a different magnet group area AMGa # AMGb and an equal magnet number NMa=NMb=6. The transport unit TE1.1 in FIG. 3f has a square transport unit shape with LTE=BTE, wherein the first and second magnet groups MGa, MGb have a different magnet group area AMGa # AMGb and a different magnet number NMa=11, NMb=6. It can be seen from this that a large number of different variants of a transport unit TE1.1 having a different pole pitch TA<Tb can be implemented.

A transport unit TE1.1 having a 2D arrangement of the drive magnets 4 is shown in FIG. 3g and FIG. 3h. In the 2D arrangement, the drive magnets 4 of different magnetic orientations are arranged in a chessboard pattern. The illustrated examples show a Halbach arrangement in which the magnetic orientations of adjacent drive magnets are rotated by 90° relative to one another. The hatched and non-hatched drive magnets 4 symbolize drive magnets 4 having an opposite magnetic orientation, i.e., magnetic north and south poles. The drive magnets 4 in between have a direction of magnetization rotated by 90°, as is symbolized by the arrows. The Halbach arrangement has the advantage that the magnetic flux on one side (preferably the side facing the transport plane 3) is greater than on the opposite side. The Halbach arrangement is known in the prior art, which is why no further details are given at this point.

At least one first magnet group MGa and at least one second magnet group MGb are in turn arranged on the transport unit TE1.1 of FIG. 3g+3h, in each of which a plurality of drive magnets 4 is provided. In the example according to FIG. 3g, nine first magnet groups MGa are provided next to one another in the Y direction, each having a certain magnet number NMa of drive magnets 4 arranged one behind the other in the X direction, as indicated by the top first magnet group MGa. Similarly, seventeen second magnet groups MGb are provided next to one another in the X direction, each having a certain magnet number NMb of drive magnets 4 arranged one behind the other in the Y direction, as indicated by the second magnet group MGa on the outside right. The magnet groups MGa, MGb are therefore not separate in the 2D arrangement, as in the 1D arrangement, but the drive magnets 4 are part of the first magnet groups MGa and part of the second magnet groups MGb.

In the case of the Halbach arrangement, the pole pitch Ta is measured between a drive magnet 4 having a magnetic north pole and a following drive magnet 4 having a magnetic south pole. According to the invention, the pole pitch Ta of the first magnet groups MGa is smaller than the pole pitch Tb of the second magnet groups MGb. In the example according to FIG. 3g, the transport unit TE1.1 has a square transport unit base having an equal transport unit length and transport unit width LTE=BTE. Because of the different pole pitch Ta<Tb, a plurality of second magnet groups MGb are therefore provided as first magnet groups MGa. The transport unit TE1.1 according to FIG. 3h has an equal number of nine first and second magnet groups MGa, MGb. Due to the different pole pitch Ta<Tb, the transport unit TE1.1 therefore has a rectangular transport unit base having a shorter transport unit length than transport unit width LTE<BTE. The non-rectangular embodiment (LTE<BTE) of the transport unit TE1.1 (both in a 1D and in a 2D arrangement of the drive magnets 4) has the advantage, for example, that more shuttles can be moved in the first main movement direction H1 than with a square design. As a result, for example, the throughput of a transport process can advantageously be increased.

A variant of the invention is explained below with reference to FIG. 4. FIG. 4 shows a transport device 1 in which a plurality of transport segments 2a-2f are lined up in order to form a larger transport plane 3. The transport segments 2a-2f are designed analogously, as was previously described with reference to FIG. 1a-1c. A first coil group SG1 having a plurality of (in this case "long") drive coils AS1 and a second coil group SG2 having a plurality of (in this case "short") drive coils AS2 are provided on each of the transport segments 2a-2f, as shown in the partly broken away transport segment 2a in FIG. 4. Consequently, the transport segments 2 each have a first main movement direction H1 and a second main movement direction 2 normal thereto. The drive coils AS1 of the first coil group SG1 have a smaller average coil distance S1<S2 relative to the drive coils AS2 of the second coil group SG2. The transport segments 2a-2f are identical here, but transport segments 2 of different shapes could of course also be combined, for example transport segments 2 having a square transport plane 3, as indicated by the dashed transport segment 2g. The respective first main movement directions H1 of the transport segments 2a, 2b, 2e run parallel, in this case in the X direction, and the respective first main movement directions H1 of the transport segments 2c, 2d, 2f run parallel, in this case in the Y direction.

Two transport units TE1.2 and TE2 are provided in transport device 1, on each of which, as described, at least one first and at least one second magnet group MGa, MGb, each having a plurality of drive magnets 4 arranged one behind the other in a specific arrangement direction with a specific pole pitch Ta, Tb and having a different direction of magnetization, are arranged. The drive magnets 4 of the two transport units TE1.2, TE2 are each arranged in a 1D arrangement here, but of course a 2D arrangement would also be possible. According to the invention, it is provided that all magnet groups MGa, MGb of the transport unit TE1.2 have pole pitches Ta=Tb of equal size and all magnet groups MGa, MGb of the other transport unit TE2 have pole pitches Ta=Tb of equal size, wherein the (uniform) pole pitch Ta=Tb of the transport unit TE1.2 is different from the (uniform) pole pitch Ta=Tb of the transport unit TE2, in particular smaller in this case.

In this case, the transport unit TE1.2 is moved along a predefined closed two-dimensional first movement path BP1, which extends over the transport segments 2b, 2c, 2e, 2f. In this case, the transport unit TE2 is moved along a predetermined two-dimensional second movement path BP2, which extends over the transport segments 2d, 2c, 2b, 2a. Of course, a plurality of transport units TE1.2, TE2 could also be moved simultaneously one behind the other along the respective movement path BP1, BP2. The first movement path BP1 is advantageously defined such that a portion of the first main movement direction H1 in a movement path length LBP1 of the first movement path BP1 is greater than a portion of the second main movement direction H2. The second movement path BP2 is preferably defined such that a portion of the first main movement direction H1 in a movement path length LBP2 of the second movement path BP2 is smaller than a portion of the second main movement direction H2. The movement path lengths LBP1, LBP2 of the movement paths BP1, BP2 correspond to the geometric length of the respective movement path BPI, BP2, i.e., the distance covered by a transport unit TEi when moving along the respective movement path BP1, BP2.

As a result, the transport unit TE1.2 having the (comparatively) smaller (uniform) pole pitch Ta=Tb is primarily moved in the first main movement direction H1 of the transport plane 3 and the transport unit TE2 having the (comparatively) larger (uniform) pole pitch Ta=Tb in the transport plane 3 is primarily moved in the second main movement direction H1. This allows efficient operation of the transport device 1 because, in order to move the transport unit TE1.2, the drive magnets 4 of the transport unit TE1.2 primarily interact with the drive coils AS1 of the first coil groups SG1 of the transport segments 2, which drive coils have a smaller coil distance S1 than the drive coils of the second coil groups SG2. Similarly, to move the transport unit TE2, the drive magnets 4 of the transport unit TE2 primarily interact with the drive coils AS2 of the second coil groups SG2 of the transport segments 2, which drive coils have a larger coil distance S2 than the drive coils AS1 of the first coil groups SG1. Transport units TE1.2, TE2 having different pole pitches Ta, Tb can therefore advantageously be used to increase the efficiency of the operation of the transport device 1 by defining advantageous movement paths BP1, BP2.

Preferably, the (uniform) pole pitch Ta=Tb of the transport unit TE1.2 can in turn be adapted to the average coil distance S1 of the drive coils AS1 of the first coil group SG1, and the (uniform) pole pitch Ta=Tb of the transport unit TE2 can be adapted to the average coil distance S2 of the drive coils AS2 of the second coil group SG2, as has already been described in detail.

The invention claimed is:

1. A transport device in the form of a planar motor, the transport device comprising:
   at least one transport segment that forms a transport plane;
   at least one first transport unit configured and arranged to be moved at least two-dimensionally on the transport plane;
   a plurality of drive coils arranged on the at least one transport segment;

at least one first and at least one second magnet group arranged on the at least one first transport unit, each magnet group having a plurality of drive magnets having a different direction of magnetization arranged one behind the other in a specific arrangement direction with a specific pole pitch wherein different pole pitches are provided on the at least one first transport unit for the at least one first magnet group and the at least one second magnet group;

a first coil group having a first plurality of drive coils, the first coil group defines a first main movement direction for moving the at least one first transport unit; and a second coil group having a second plurality of drive coils, the second coil group defines a second main movement direction for moving the at least one first transport unit;

wherein the first and second coil groups are arranged on the at least one transport segment, characterized in that the first plurality of drive coils are arranged at an average first coil distance from the first magnet group of the at least one first transport unit in a normal direction onto the transport plane, and the second plurality of drive coils are arranged at an average second coil distance from the second magnet group of the at least one first transport unit in a normal direction onto the transport plane, said second average coil distance being greater than the first average coil distance, wherein on the at least one first transport unit the pole pitch of the at least one first magnet group is smaller than the pole pitch of the at least one second magnet group.

2. The transport device (1) according to claim 1, further including at least one second transport unit and at least one third transport unit, on each of which at least one first and at least one second magnet group are arranged, wherein in each magnet group a plurality of drive magnets having a different direction of magnetization are arranged one behind the other in a specific arrangement direction with a specific pole pitch, wherein all magnet groups of the at least one second transport unit and all magnet groups of the at least one third transport unit have the same pole pitch and wherein the pole pitch of the at least one second transport unit is smaller than the pole pitch of the at least one third transport unit.

3. The transport device according to claim 2, characterized in that the first plurality of drive coils of the first coil group are arranged at an average first coil distance from the first magnet groups of the at least one second transport unit and the at least one third transport unit in a normal direction onto the transport plane, and wherein the second drive coils of the second coil group are arranged at an average second coil distance from the second magnet groups of the at least one second transport unit and the at least one third transport unit in a normal direction onto the transport plane, said second average coil distance being greater than the first average coil distance, wherein a first movement path is defined on the transport plane for the at least one second transport unit having the smaller pole pitch, along which first movement path the at least one second transport unit is configured and arranged to be moved, and a second movement path is defined on the transport plane for the at least one third transport unit having the larger pole pitch, along which second movement path the at least one third transport unit is configured and arranged to be moved, wherein a portion of the first main movement direction in a movement path length of the first movement path is greater than a portion of the second main movement direction and a portion of the first main movement direction in a movement path length of the second movement path is smaller than a portion of the second main movement direction.

4. The transport device according to claim 1, characterized in that the pole pitch of the drive magnets of at least one of the at least two magnet groups of at least one first, second or third transport unit is defined as a function of the average coil distance of the first and second drive coils cooperating therewith.

5. The transport device according to claim 1, characterized in that a magnet width and/or a magnet height in a normal direction onto the transport plane of the drive magnets of at least one of the at least two magnet groups of at least one first, second or third transport unit is defined as a function of the pole pitch of the respective magnet group.

6. The transport device according to claim 1, characterized in that the at least two magnet groups of the at least one first, second or third transport unit have an equal magnet group area and/or have an equal magnet number of drive magnets and/or that the at least one transport unit has a square or rectangular transport unit base.

7. The transport device according to claim 1, characterized in that the drive magnets of at least one magnet group of the at least one first, second or third transport unit each have an equal magnet width, wherein adjacent drive magnets of the respective magnet group are directly adjacent to each other.

8. A transport unit for a transport device in the form of a planar motor according to claim 1, the transport unit including the at least two magnet groups, each having the plurality of drive magnets arranged one behind the other in a specific arrangement direction with the specific pole pitch and having a different direction of magnetization, wherein the pole pitches of the at least two magnet groups differ, characterized in that a magnet width and/or a magnet height in a normal direction on the underside of the drive magnets, of at least one magnet group, is defined as a function of the pole pitch of the respective magnet group.

9. The transport unit according to claim 8, characterized in that the drive magnets of at least one of the at least two magnet groups each have an equal magnet width, wherein adjacent drive magnets of the magnet group are directly adjacent to each other.

10. The transport unit according to claim 8, characterized in that the at least two magnet groups have an equal magnet group area, and/or have an equal magnet number of drive magnets, and/or in that the transport unit has a square or rectangular transport unit base.

11. A method for operating a transport device including the following steps:

providing a planar motor having at least one transport segment that forms a transport plane and providing at least one first transport unit that is moved at least two-dimensionally on the transport plane, arranging a plurality of drive coils on the at least one transport segment, arranging at least one first and at least one second magnet group on the at least one first transport unit, each magnet group having a plurality of drive magnets with a different direction of magnetization arranged one behind the other in a specific arrangement direction with a specific pole pitch, providing different pole pitches on the at least one first transport unit for the at least one first magnet group (MGa) and the at least one second magnet group, arranging a first coil group having a first plurality of drive coils on the transport segment, which first coil group defines a first main movement direction for moving the at least one first transport unit, and arranging a second coil group having a second plurality of drive coils on the transport segment, which second coil group defines a second main movement direction for moving the at least one first transport unit, arranging the first plurality of drive coils of the first coil group at an average first coil distance from the first magnet group of the at least one first transport unit in a normal direction onto the transport plane, and arranging the second plurality of drive coils of the second coil group at an average second coil distance from the second magnet group of the at least one first transport unit in a normal direction onto the transport plane, said second average coil distance being greater than the first average coil distance, and wherein the pole pitch of the at least one first magnet group is smaller than the pole pitch of the at least one second magnet group on the at least one first transport unit.

12. The method according to claim 11, characterized in that at least one second transport unit and at least one third transport unit are moved on the transport plane of the transport device, on each of which at least one first and at least one second magnet group, each having a plurality of drive magnets having a different direction of magnetization arranged one behind the other in a specific arrangement direction with a specific pole pitch, providing the same pole pitch for all magnet groups of the at least one second transport unit and for all magnet groups the at least one third transport unit, and providing a smaller pole pitch on the at least one second transport unit than on the at least one third transport unit.

13. The method according to claim 12, further including the steps of:

arranging the first plurality of drive coils of the first coil group at an average first coil distance from the first magnet groups of the at least one second transport unit and the at least one third transport unit in a normal direction onto the transport plane, and arranging the second plurality of drive coils of the second coil group at an average second coil distance from the second magnet groups of the at least one second transport unit and the at least one third transport unit in a normal direction onto the transport plane, said second average coil distance being greater than the first average coil distance, moving the at least one second transport unit having the smaller pole pitch along a defined first movement path on the transport plane, and moving the at least one third transport unit having the larger pole pitch along a defined second movement path on the transport plane, defining the movement paths in such a way that a portion of the first main movement direction in a movement path length of the first movement path is greater than a portion of the second main movement direction and a portion of the first main direction of movement in a movement path length of the second movement path is smaller than a portion of the second main movement direction.

14. The method according to claim 11, characterized in that the pole pitch of the plurality of drive magnets of at least one of the first and second magnet groups of the at least one first, second or third transport unit is defined as a function of the average coil distance of the drive coils.

15. The method according to claim 11, characterized in that a magnet width and/or a magnet height in a normal direction onto the transport plane of the drive magnets of at least one of the first and second magnet groups of the at least one first, second or third transport unit is defined as a function of the pole pitch of the respective magnet group.

16. The method according to claim 11, further including the steps of:

providing equal magnet group areas and/or an equal magnet number of the plurality of drive magnets for the at least two magnet groups of the at least one first, second or third transport unit, and/or providing a square or rectangular transport unit base for the at least one first, second or third transport unit.

17. The method according to claim 12, characterized in that the pole pitch of the plurality of drive magnets of at least one of the first and second magnet groups of the at least one first, second or third transport unit is defined as a function of the average coil distance of the drive coils.

18. The method according to claim 12, characterized in that a magnet width and/or a magnet height in a normal direction onto the transport plane of the drive magnets of at least one of the first and second magnet groups of the at least one first, second or third transport unit-is defined as a function of the pole pitch of the respective magnet group.

19. The method according to claim 12, further including the steps of:

providing equal magnet group areas and/or an equal magnet number of the plurality of drive magnets for the at least two magnet groups of the at least one first, second or third transport unit, and/or providing a square or rectangular transport unit base for the at least one first, second or third transport unit.

20. The transport device according to claim 2, characterized in that the pole pitch of the drive magnets of at least one of the at least two magnet groups of at least one first, second or third transport unit is defined as a function of the average coil distance of the first and second drive coils cooperating therewith.

21. The transport device according to claim 2, characterized in that a magnet width and/or a magnet height in a normal direction onto the transport plane of the drive magnets of at least one of the at least two magnet groups of at least one first, second or third transport unit is defined as a function of the pole pitch of the respective magnet group.

22. The transport device according to claim 2, characterized in that the at least two magnet groups of the at least one first, second or third transport unit have an equal magnet group area and/or have an equal magnet number of drive magnets and/or that the at least one transport unit has a square or rectangular transport unit base.

23. The transport device according to claim 2, characterized in that the drive magnets of at least one magnet group of the at least one first, second or third transport unit each have an equal magnet width, wherein adjacent drive magnets of the respective magnet group are directly adjacent to each other.

* * * * *